United States Patent [19]

Parker

[11] Patent Number: 4,897,771
[45] Date of Patent: Jan. 30, 1990

[54] REFLECTOR AND LIGHT SYSTEM

[75] Inventor: Jeffrey R. Parker, Concord, Ohio

[73] Assignee: Lumitex, Inc., North Royalton, Ohio

[21] Appl. No.: 125,323

[22] Filed: Nov. 24, 1987

[51] Int. Cl.[4] ............................................. F21V 7/00
[52] U.S. Cl. ..................................... 362/298; 362/32;
362/549; 362/346
[58] Field of Search ............... 362/277, 298, 299, 301,
362/302, 304, 319, 346, 347, 349, 32, 19, 297

[56] References Cited

U.S. PATENT DOCUMENTS

| | | | |
|---|---|---|---|
| 1,235,484 | 7/1917 | Jones | 302/277 |
| 1,575,327 | 3/1926 | Garford et al. | 362/303 |
| 1,589,664 | 6/1926 | Ryland | 362/302 |
| 1,645,721 | 10/1927 | Pfeil | 362/298 |
| 1,731,104 | 10/1929 | Mayer | 362/277 |
| 1,880,399 | 10/1932 | Benjamin | 362/277 |
| 1,894,876 | 1/1933 | Kuhn | 362/302 |
| 1,995,012 | 3/1935 | Rivier | 362/284 |
| 2,131,852 | 10/1938 | Brackett | 362/268 |
| 2,340,515 | 2/1944 | Dietrich | 362/214 |
| 3,078,760 | 2/1963 | Brownscombe | 362/261 |
| 3,455,622 | 7/1969 | Cooper | 362/32 |
| 3,494,693 | 2/1970 | Elmer | 353/55 |
| 3,770,338 | 11/1973 | Helmuth | 350/96.1 |
| 3,832,539 | 8/1974 | Oram | 362/301 |
| 3,900,726 | 8/1975 | Tichenor | 362/277 |
| 4,151,584 | 4/1979 | Labrum | 362/302 |
| 4,241,382 | 12/1980 | Daniel | 362/32 |
| 4,305,099 | 12/1981 | True et al. | 358/231 |
| 4,420,800 | 12/1983 | Van Horn | 362/297 |
| 4,420,801 | 12/1983 | Reiling et al. | 362/297 |
| 4,447,865 | 5/1984 | Van Horn et al. | 362/305 |
| 4,460,939 | 7/1984 | Murakami et al. | 362/32 |
| 4,463,410 | 7/1984 | Mori | 362/349 |
| 4,494,176 | 1/1985 | Sands et al. | 362/297 |
| 4,496,211 | 1/1985 | Daniel | 350/96.2 |
| 4,536,834 | 8/1985 | Daniel | 362/261 |
| 4,576,436 | 3/1986 | Daniel | 350/96.1 |
| 4,587,601 | 5/1986 | Collins | 362/303 |
| 4,654,758 | 3/1987 | Szekacs | 362/61 |
| 4,755,918 | 7/1988 | Pristash et al. | 362/32 |

FOREIGN PATENT DOCUMENTS

119470 10/1919 United Kingdom .
763376 12/1956 United Kingdom .

Primary Examiner—Ira S. Lazarus
Assistant Examiner—D. M. Cox
Attorney, Agent, or Firm—Renner, Otto, Boisselle & Sklar

[57] ABSTRACT

Reflector and light systems include collecting and back reflecting surfaces that efficiently collect the energy produced by a light source and redirect the light back through the collecting surface without restriking the collecting surface or the light source. The reflected light does not reach the focus for the back reflecting surface until the light exits the system. A lens-end bulb may be used as the light source to produce a projected cone of light that is focused on a target that is positioned in front of the second focus and a reflected cone of light that is focused on the same target. In one form of the invention, the back reflecting surface is eliminated to permit the projected light to be focused on one target located externally of one end of the system and the reflected light to be focused on another target located externally of the other end of the system.

46 Claims, 4 Drawing Sheets

REFLECTOR AND LIGHT SYSTEM

BACKGROUND OF THE INVENTION

This invention relates generally, as indicated, to a reflector and light system, and more particularly, to such a system which provides a relatively compact, optically efficient and cost effective light source for a target, especially a relatively tight target such as a fiber optics light pipe or the like that requires the light to strike the target at a minimum acceptance angle.

Because of the increased use of fiber optics light pipes and the like to transmit light, there is an increasing need for a more efficient light source for the transmitted light. Fiber optics light pipes generally consist of one or more strands of glass or plastic fibers which may be used for a wide variety of applications, including inspection lighting, ultraviolet curing, phototherapy, instrumentation, clean rooms, and fiberscopes and the like.

It is generally known from U.S. Pat. No. 4,241,382 to provide an illuminator in the form of a light bulb having a fiber optics coupler as an integral part of the envelope. The bulb is provided with a combination of ellipsoidal and spherical mirrors which direct the light through an optical window to a fiber optics light pipe or the like. To facilitate trapping of the light in the optical fibers, the light may be caused to emerge from the optical window at angles equal to or less than the critical angle of the fibers.

The critical angle is the maximum angle of incidence of the light rays striking the fibers that will experience total internal reflection within the fibers. Therefore, all of the light that is focused on the fibers must strike the fiber ends at angles equal to or less than the critical angle or that portion of the light which does not will not be transmitted by the fibers.

Although the illuminator of the aforementioned U.S. Pat. No. 4,241,382 accounts for the critical angle, such illuminator does not effectively account for the attenuation of the light in the fibers. When light is transmitted through an absorbing medium, the irradiance decreases exponentially with the distance of transmission. The distance light must travel within optical fibers is inversely proportional to the cosine of the angle that the light enters the fibers. Therefore, a light source that directs light at a target at a minimum acceptance angle would be optimal.

To achieve a small acceptance angle with the illuminator of U.S. Pat. No. 4,241,382 would require an increase in the distance between the filament and the optical window, which has the objection that the overall dimensions of the illuminator would have to be increased exponentially. Also, increasing such distance would cause the distance between the filament and the ellipsoidal surface to decrease. As the filament nears the ellipsoidal surface, defocus occurs causing a greater percentage of the light to be reflected at non-collectable angles or reflected back into the filament. Therefore, there is a minimum average acceptance angle that this particular illuminator can produce.

British Patent Specification No. 763,376, published Dec. 12, 1956, discloses a multi-reflector system that addresses some of these problems by providing a rearwardly facing reflector that reflects the light back onto a forwardly facing reflector that in turn reflects the light forwardly in a parallel beam. However, this system has the drawback that the focal point for the forwardly facing reflector is within the reflector system itself. Also, the forwardly facing reflector reflects the light as a parallel beam, which makes it difficult to focus the light on a relatively tight target outside the reflector, and the light is reflected back through the light source which blocks out a large percentage of the light before it reaches the target.

SUMMARY OF THE INVENTION

With the foregoing in mind, it is a principal object of this invention to provide reflector and light system that provides a relatively compact, optically efficient and cost effective light source for a target.

Another object is to provide such a system that efficiently collects and focuses substantially all of the light emitted from the light source onto a target at a minimum acceptance angle.

Still another object is to provide such a system including a collecting reflector and back reflector which collect and redirect the reflected light back through the collecting reflector to keep the overall package size to a minimum.

A further object is to provide such a system in which the reflected light forms a cone of light that passes back through the collecting reflector with minimum reflected light striking the light source or restriking the collecting reflector.

Yet another object is to provide such a system which produces a projected cone of light that is focused on a target positioned at a distance from the light source where the cross sectional area of the projected light substantially equals that of the target.

Yet another object is to provide such a system in which the reflected cone of light also strikes the target at the plane where the cross-sectional area of the reflected cone substantially equals the cross-sectional area of the target.

These and other objects may be achieved by providing in one form of the invention a system including a rearwardly facing collecting reflector for collecting substantially all of the reflected light eminating from a light source located substantially at the focal point of the collecting reflector, and a forwardly facing back reflector which receives the reflected light from the collecting reflector and redirects the light back through the collecting reflector onto a target externally of the reflector.

In accordance with one aspect of the invention, the light source is a lens-end incandescent bulb that projects a cone of light through an axial opening or window in the smaller end of the collecting reflector and focuses the projected light on the target located externally of the reflector system at the point where the cross-sectional area of the projected cone substantially equals that of the target.

Further in accordance with the invention, the additional light produced by the lens-end bulb that is not directly projected onto the target is emitted radially in the shape of a conical section rotated about the principal axis of the bulb and reflected by the collecting reflector surrounding same. This conical section of additional light has substantially constant start and stop angles which intersect the reflecting surface of the collecting reflector. The additional non-projected light is reflected onto the back reflector which in turn re-reflects the additional non-projected light back through the collecting reflector and focused on the target, preferably substantially without striking the light source or restriking the collecting reflector. Also, the reflector system is desirably designed so that the reflected cone of light strikes the target at the plane where the cross-sectional area (diameter) of the reflected cone substantially equals that of the target, and the outer periphery (surface) of the reflected cone also intersects the outer periphery (surface) of the projected cone.

Further in accordance with the invention, the collecting reflector may be an ellipsoidal section and the back reflector a flat circular disc with a central hole of a size to permit the light source and holder therefor to pass.

Also in accordance with the invention, the back reflector may be axially adjustable relative to the collecting reflector to allow for proper focusing of the light when bulbs and/or lenses of different sizes and shapes are used.

In accordance with another aspect of the invention, the reflector assembly may be vented to provide for internal cooling.

Further in accordance with the invention, a suitable coupling may be provided around the light discharge opening or window in the reflector assembly for supporting the target at the desired distance exteriorly of the assembly.

Still further in accordance with the invention, a light pipe may be utilized to transmit the light rays exteriorly of the reflector assembly to a target located a desired distance beyond the reflected focal point.

In another form of the invention, both the collecting reflector and back reflector may be parabolic surfaces, with the light source placed substantially at the focal point of the collecting reflector and the target placed axially inwardly of the focal point of the back reflector where the cross-sectional area of the reflected cone of light from the back reflector substantially equals the cross-sectional area of the target.

In accordance with another aspect of the invention, a lens may be mounted at the smaller open end of the collecting reflector to refract both the projected and reflected cones of light into a parallel beam of light which is focused on the target.

In accordance with still another aspect of the invention, the back reflector may be eliminated and the reflector system utilized to focus the light rays on two targets, one located externally of each end of the collecting reflector.

Also in accordance with the invention, the collecting reflector may be elongated in the transverse direction to accommodate a line filament lamp located substantially at the focal point of the collecting reflector, and the target may be an elongated optical window adjacent the smaller end of the collecting reflector. Such a system would be especially useful in applications where a highly efficient uniform line of light is desired such as in photocopy machines, or for illuminating ribbon fiber optic cables or reading identification cards and the like.

In accordance with still another aspect of the invention, the light source may be a light emitting diode cast as part of the collecting reflector and back reflector to form a single modular unit, and the collecting and back reflectors coated with a suitable reflective material.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but several of the various ways in which the principles of the invention may be employed.

DETAILED DESCRIPTION OF THE PREFERRED EMBODIMENTS

Figure 1:
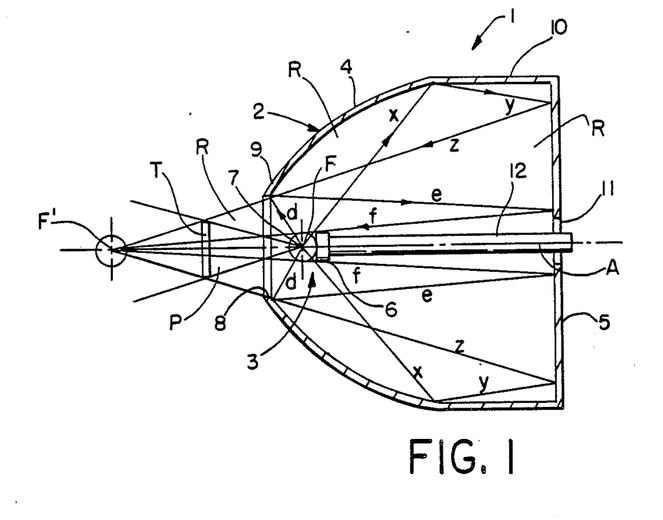
FIG. 1 is a schematic longitudinal sectional view through one form of reflector and light system in accordance with this invention.

Referring now in detail to the drawings, and initially to FIG. 1, there is schematically shown a preferred form of reflector and light system 1 in accordance with this invention including a reflector assembly 2 for collecting light rays emitted from a light source 3 mounted within the reflector assembly and focusing such light rays on a relatively tight target or light receiving area T outside the reflector assembly. In the embodiment illustrated in FIG. 1, the reflector assembly 2 includes a rearwardly facing collecting reflector 4 having an ellipsoidal contour with respect to a focal point F, and a forwardly facing back reflector 5 in the form of a flat circular disc extending perpendicular to the principal optical axis A and rearwardly spaced from the focal point F.

Figure 2:
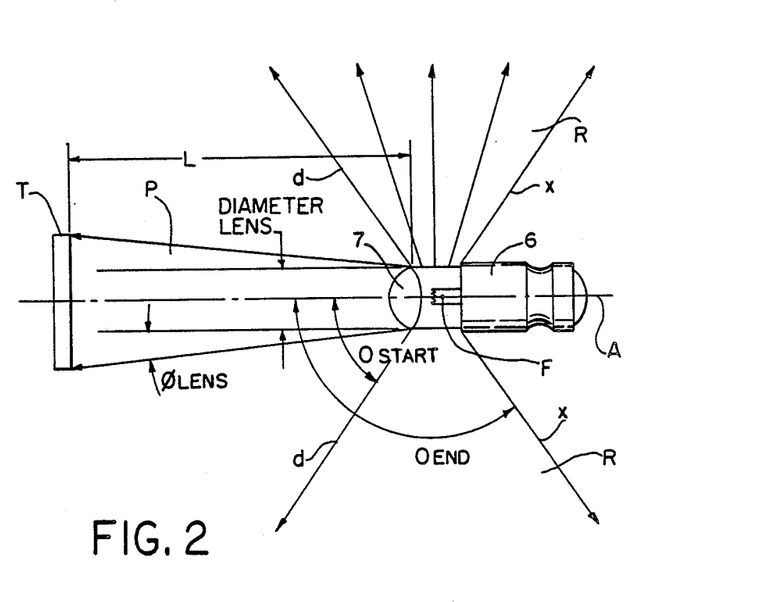
FIG. 2 is an enlarged schematic illustration of a lens-end bulb which may be used as the light source for the system of FIG. 1.

Also in the embodiment shown in FIG. 1, the light source 3 is a lens-end bulb 6 located substantially at the focal point F of the collecting reflector 4 with the bulb lens 7 projecting a cone P of light out of the system 1 through an opening 8 in the smaller end 9 of the collecting reflector. As schematically shown in greater detail in FIG. 2, the projected cone P of light increases in size with distance from the bulb and is centered about the principal optical axis. The projected cone P is focused on the target T which may, for example, be the end of a fiber optics cable which is circular in shape and located on a plane perpendicular to and centered about the original optical axis A. Also, the target T is preferably positioned at a distance from the bulb 6 where the cross-sectional area of the projected light cone P substantially equals the cross-sectional are of the target which could be at the opening 8 but is preferably forwardly spaced some distance therefrom as schematically illustrated in FIG. 1.

Substantially all of the other light rays from the bulb 6 that are not directly projected out through the opening 8 in the collecting reflector 4 are emitted radially in the shape of a conical section R rotated about the principal optical axis. Conical section R has a constant start and stop angle represented by the rays labeled d and x in FIGS. 1 and 2. The collecting reflector 4 reflects substantially all of these additional light rays (hereafter referred to as reflected cone R of light) onto the back reflector 5 which in turn further reflects the reflected light back through the opening 8 in the small end of the collecting reflector 4 and focuses such reflected light on the target T.

The optimum radius of opening 8 is the perpendicular distance from the principal optical axis A to the point on the collecting reflector where ray d and reflected ray z intersect. The elliptical shape of the collecting reflector 4 and the position of the back reflector 5 determine the position of the second reflected focal point F' and the average acceptance angle of the light rays striking the target T. The reflector system is designed such that substantially all of the light rays uniformly strike the target at a minimum acceptance angle and the reflected cone of light intersects the projected cone of light on a plane axially inwardly of the reflected focal point F' where the cross-sectional area equals that of the target. Expressed mathematically, the target T is preferably located at a distance L from the bulb 6 defined by the equation $L = 0.5$ (Diameter target−Diameter lens)/(-Tan 0) where the angle 0 is the angle between the lens diameter and the exterior of the projected cone P of light (see FIG. 2).

The back reflector 5 may be connected to the collecting reflector 4 as by means of a cylindrical section 10 extending between the collecting reflector and outer diameter of the back reflector as shown in FIG. 1. Cylindrical section 10 commences rearwardly of the point where the stop angle represented by the ray x hits the collecting reflector 4, whereby such cylindrical section does not have any effect on the efficiency of this system.

If desired, a cold mirror may be used for the back reflector 5 to provide for the removal of a high percentage of the infrared wavelengths of light and cause reflection of others, including particularly the optical wavelengths, etc.

Likewise, the collecting reflector 4 may be made of a suitable dichroic material of known type to allow certain bandwidths of energy such as infrared wavelengths to pass through the collecting reflector and cause reflection of others such as optical wavelengths, etc.

An axial hole 11 may be provided in the back reflector having a minimum diameter that will permit the bulb 6 and bulb holder 12 to pass to facilitate bulb positioning and removal and to provide a bulb support that does not interfere with light collection or projection. Alternatively, the bulb could be supported from and through the side of the collecting reflector rather than through the back reflector as shown. However, such a side support would necessarily block some of the light rays, making it less desirable.

Figure 3:
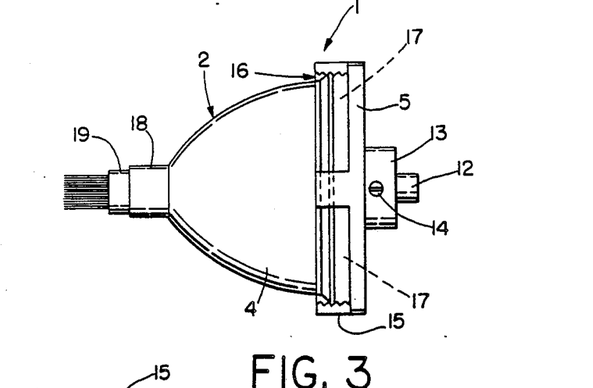
FIG. 3 is a side elevation view of a modified form of reflector and light system in accordance with this invention.
Figure 4:
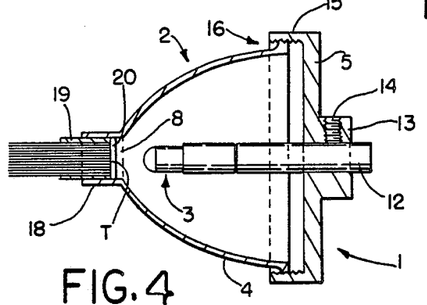
FIG. 4 is a fragmentary longitudinal section through the system of FIG. 3.

In FIGS. 3 and 4 the back reflector 5 is shown as having a rearwardly extending hub 13, with a set screw 14 extending radially therethrough for frictionally engaging the bulb holder 12 to releasably retain the light source 3 in position within the reflector assembly 2.

Also, the back reflector 5 is shown as being provided with an external flange portion 15 having a threaded connection 16 with the exterior of the collecting reflector 4 to permit limited axial adjustment of the position of the back reflector relative to the collecting reflector. This has the advantage that light sources and/or lenses of different sizes and shapes may be used with the same reflector assembly, in that adjustment of the position of the back reflector relative to the collecting reflector allows for proper focusing of the light from such different light sources and/or lenses. Also, the threaded flange 15 on the back reflector 5 may be substantially open as by providing circumferentially spaced slots 1 therein to allow for cooling of the interior of the reflector assembly through such openings without interfering with the internal reflection of light as further shown in FIGS. 3 and 4.

If desired, a suitable coupling or sleeve 18 may surround the reflector opening 8 to support the target T, in this case the end of a fiber optic cable, at the desired distance exteriorly of the collecting reflector. When the target is a fiber optic cable, the cable may have a cable connector 19 on such end which may be inserted into the connector coupling 18 and secured in place as by using a suitable epoxy or the like. Also, a filter 20 may be placed at the inner end of such cable to filter out any undesirable wavelengths.

Figure 5:
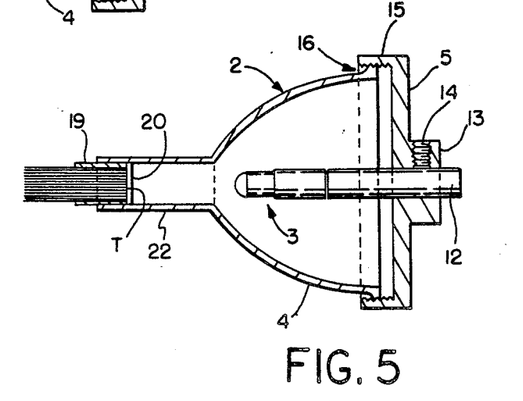
FIG. 5 is a fragmentary longitudinal section through another modified form of reflector and light system in accordance with this invention.

Moreover, a light pipe 22, shown in FIG. 5, may be used to transmit the light rays passing through the opening or window 8 to the target T which may be located a desired distance beyond the reflected focal point. The interior surface of the light pipe 22, like that of the reflector assembly, may be coated with a suitable reflective material. The light pipe 22 acts as a support for the target, and scrambles the light rays to produce a more uniform target spot with minimum loss. The length of the light pipe is determined by the light ray angles and the desired amount of diffusion of the light on the target. When the target is a fiber optic cable, a cable connector 19, similar to that shown in FIGS. 3 and 4, may be attached to the end of the cable and inserted in the outer end of the light pipe and secured in place using a suitable epoxy. Also, a filter 20, similar to that previously described, may be placed within the light pipe at the inner end of the cable to filter out undesirable wavelengths.

Although the light pipe is shown in FIG. 5 as being integral with the reflector assembly, it should be understood that the light pipe could be formed separately from the reflector assembly if desired. Also, the light pipe could be mounted in spaced relation from the reflector assembly a distance at least corresponding to the location of the second reflected focal point.

Figures 6, 7, 8, 9, 10:
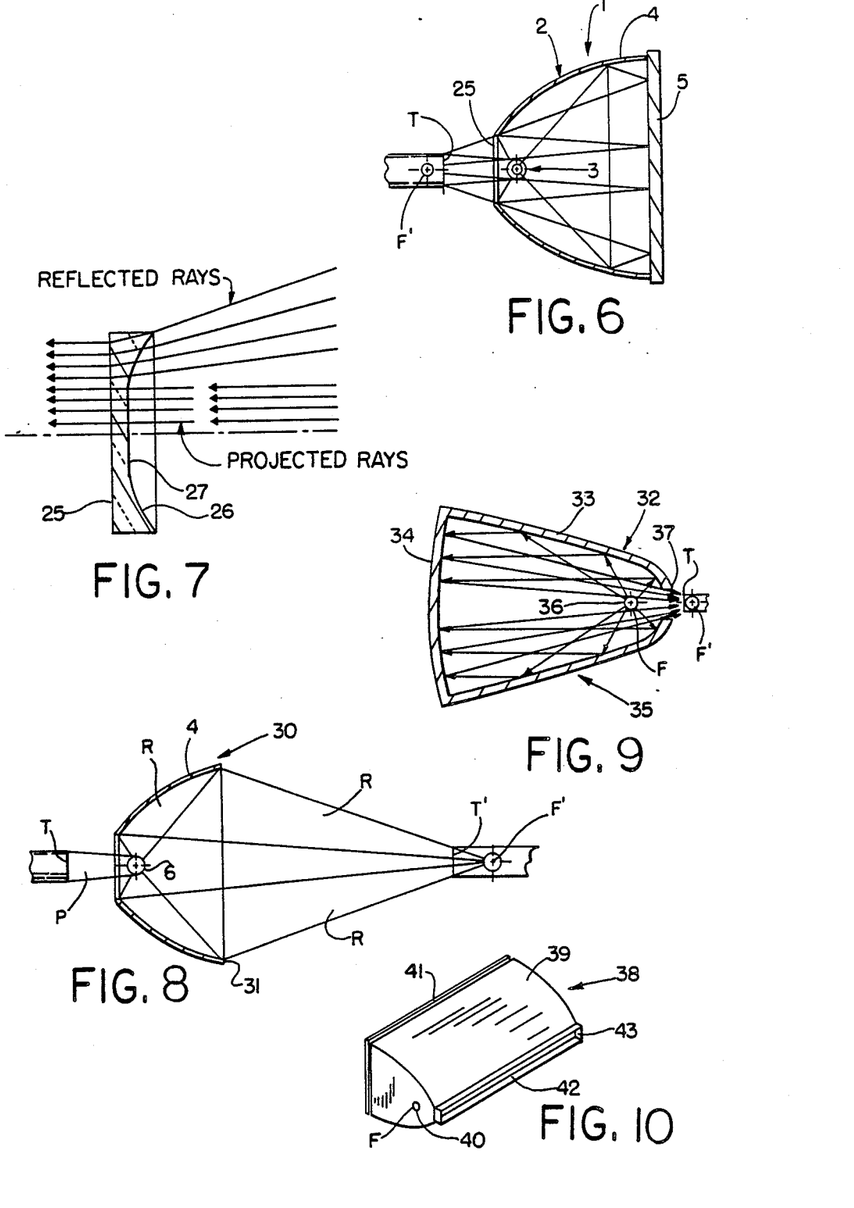
FIG. 6 is a schematic longitudinal sectional view of another form of reflector and light system in accordance with this invention.
FIG. 7 is an enlarged longitudinal sectional view through a lens which may be used with the system of FIG. 6.
FIGS. 8 and 9 are schematic longitudinal sectional views through other reflector and light systems in accordance with this invention.
FIGS. 10 and 11 are schematic perspective views of still two more reflector and light systems in accordance with this invention.

Also, if desired, a lens 25 may be disposed within the smaller open end 8 of the collecting reflector 4 to redirect both the projected and reflected cones P and R of light into a parallel beam of light which is then focused on the target T as schematically shown in FIG. 6. The lens 25 itself is shown in greater detail in FIG. 7 as having a concave outer ring portion 26 that refracts the reflected rays R into a parallel beam and a flat or convex central portion 27 that also refracts the projected rays P into a parallel light beam. If such a lens 25 is used, the position and diameter of the target T will have to be changed accordingly. Otherwise, the details of construction and operation of the reflector and light system 1 shown in FIG. 6, are substantially the same as that shown in FIG. 1.

If desired, the back reflector of FIGS. 1 through 6 could be removed from the system as schematically shown in FIG. 8, in which event the system 30 could be used to focus the projected and reflected light rays P and R on two different targets. One of the targets T would still be located directly in front of the lens bulb 6 at the point where the cross-sectional area of the projected cone P of light substantially equals that of the target. The other Target T' would be placed just before the second focal point F' of the collecting reflector 4 where the cross-sectional area of the reflected cone R of light off the collecting reflector substantially equals that of the other target T'. Of course, in that event, both the small and large ends of the collecting reflector would be open at 8 and 31 to permit the projected light P to be focused on the first target T and the reflected light R to be focused on the second target T'.

In FIG. 9 there is shown another form of reflector and light system 32 in accordance with this invention in which both the collecting reflector 33 and back reflector 34 which comprise the reflector assembly 35 are parabolic dishes, and the light source 36 is placed substantially at the focal point F of the collecting reflector and the target T is placed just before the focal point F' of the back reflector 34 which is located along the principal optical axis outside the smaller open end 37 of the collecting reflector 33. Here again, the light source 36 may be a lens-end bulb with the lens projecting a cone of light out of the system through the opening 37 in the smaller end of the collecting reflector and focused on the target T and the additional light reflected by the collecting reflector onto the back reflector and then off the back reflector back through the collecting reflector and out the opening 37 and focused on the target T, similar to the system 1 previously described. Such a reflector assembly 35 is desirably designed so that all of the reflected light passes back through itself and does not strike the bulb 36 or restrike the collecting reflector 33, similar to the reflector designs previously described.

In still another form of reflector and light system 38 shown in FIG. 10, the collecting reflector 39 is elongated in the transverse plane to accommodate a line filament lamp 40 located substantially at the focus F of the collecting reflector which extends substantially the full width thereof. Also, the back reflector 41 may be a flat rectangular mirror whose focus is outside a long narrow optical window 42 extending substantially the full width of the smaller open end 43 of the collecting reflector. Such a reflector and light system 38 may be used in any application where a highly efficient uniform line of light is desired, such as in photocopy machines, or for illuminating ribbon fiber optic cables or reading identification cards and the like.

Figure 11:
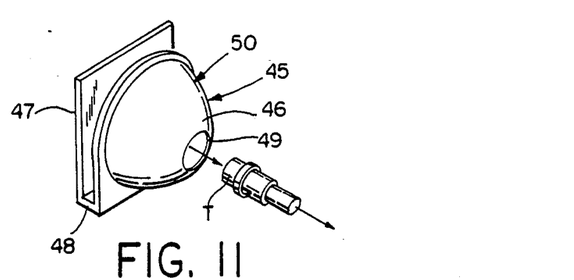

Yet another form of reflector and light system 45 in accordance with this invention is schematically shown in FIG. 11. In this embodiment, the light source (not shown) may be a light emitting diode, and the collecting reflector 46 and back reflector 47 may be cast in the desired contoured shape as a single modular unit with the back reflector 47 connected to the collecting reflector 46 in spaced relation therefrom as by means of a generally U-shaped flange 48 extending between the exterior surfaces thereof. The collecting reflector 46 may have an ellipsoidal shape and the back reflector 47 a substantially flat rectangular shape as shown. Moreover, both reflectors 46 and 47 may be coated with a suitable internal reflective material to reflect the light from the light emitting diode back through the collecting reflector and out through the smaller open end o window 49 of the collecting reflector and focused on a target T, for example, a fiber optic cable, located externally of the reflector assembly 50. The shape of the two reflectors 46, 47 will be determined by the size and shape of the target. The advantage of this particular system is that it can be produced inexpensively in large quantities.

Figure 12:
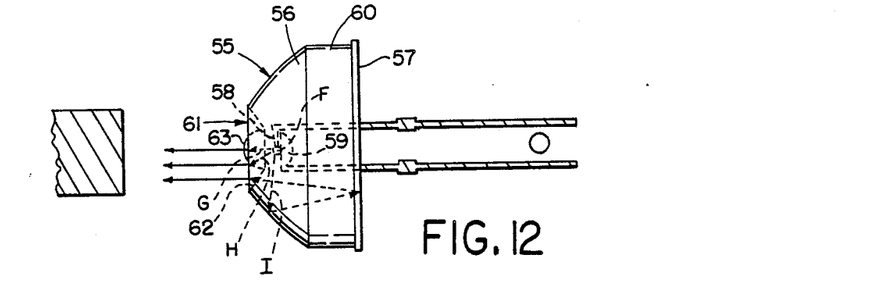
FIGS. 12 and 13 are schematic side elevation views of still two more reflector and light systems in accordance with this invention.

In FIG. 12 there is schematically illustrated still another form of reflector and light system 55 in accordance with this invention which is a form of electroluminescent diode cast as part of a solid unit including both a collecting reflector 56 and a back reflector 57. This unit can produce both visible and infrared light. Visible units incorporate gallium phosphorous or gallium aluminum chips cast into the center of the unit as a light source. Such a diode emits light along the junction region and also over the top surface of the junction. The contacts 58, 59 are shaped such that light is emitted in a forward direction and do not interfere with light collection or projection.

In the particular embodiment shown in FIG. 12, the collecting reflector 56 is in the shape of an ellipsoidal section rotated about the principal optical axis and the back reflector 57 is in the shape of a round circular disc centered about the same axis. The collecting and back reflectors 56, 57 may be joined by a cylindrical section 60 similar to that shown in FIG. 1. Also, all three of these surfaces 56, 57 and 60 may be deposited or coated with an internally reflective substance such that total internal reflection occurs.

Unit 55 also includes a front window 61 in the shape of a sloped washer 62 with a parabolic or elliptically shaped hub 63 at its center. The washer 62 and hub 63 surfaces are centered about the principal optical axis, and if the slopes of the rotated washer 62 surfaces were extended, they would intersect the focal point F which corresponds to the first focal point of the collecting reflector 56 and the focal point of the front hub 63. While the sloped washer 62 is shown as being substantially flat, it should be understood that such washer may also be curved, or of a convex or concave shape, depending on the desired results.

Typical light ray paths are also schematically shown in FIG. 12. Rays G and H are emitted so that they first strike the front hub 63, which causes them to be refracted in such a manner that they are transformed either into a parallel beam or focused to the size and shape of target T as desired. Ray I is emitted in a direction such that it first strikes the collecting reflector 56 and is reflected thereby onto the back reflector 57 which re-reflects the ray toward the optical window 61. Upon striking the washer section 62 of the optical window, ray I is refracted so that it also becomes a parallel ray or is focused to the size and shape of the target.

Figure 13:
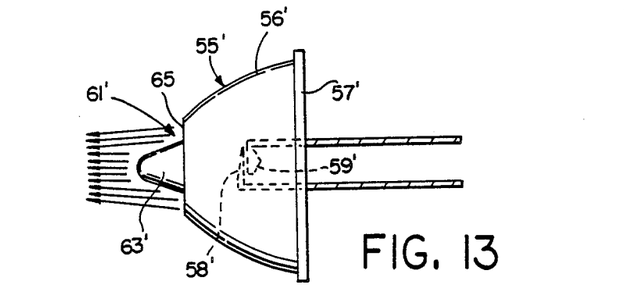

This type of system can also be provided with a front window 61' having a flat washer section 65 as shown in FIG. 13 instead of a sloped washer section 62 as shown in FIG. 12. Also, the ellipsoidal section of the collecting reflector 56' may be extended toward the rear to intersect the back reflector 57' as further shown in FIG. 13. Otherwise, the details of construction and operation of the system shown in FIG. 13 are substantially the same as that shown in FIG. 12, and accordingly, the same reference numerals followed by a prime symbol are used to designate like parts.

A system of the type shown in FIGS. 12 or 13 may be but need not be epoxied directly to the end of a fiber optic cable. Also, the light source may be used to produce both visible and/or infrared energy, and may include more than one light emitting junction which does not have to be located at the focal point of the ellipsoidal section 56 or 56'.

From the foregoing, it will now be apparent that the various systems of the present invention disclosed herein provide a relatively compact, optically efficient and cost effective light source for a target such as a fiber optic cable. However, it should be understood that the target may be other light receiving areas than a fiber optic cable including, for example, a lens, filter, hot mirror, cold mirror or the like. Also, while it is preferred that the target be generally circular, it may be of other shapes as well.

Moreover, while the light source is preferably a lens-end filament lamp, it will be apparent that other means for producing light having variety of different voltage and current requirements may be used, including, for example, a light emitting diode, an arc lamp, a sodium vapor lamp, and a high intensity discharge lamp. Also, the collecting and back reflectors may be made out of any suitable materials such as plastic, glass or metal that can be formed to the proper shape or coated. Furthermore, the reflecting surfaces may be elliptical, parabolic, circular, flat, compound, multi-mirror or any combination that will direct the light back through the collecting reflector and focus on the target. Other modifications may also be necessary for a particular application including the use of cooling fins, mounting brackets, light source holders, coatings and filters to aid in the transmission and absorbtion of certain frequencies of electromagnetic radiation.

Although the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the claims.

What is claimed is:

1. A reflector and light system comprising a reflector assembly including collector means having a first focus, a light source positioned substantially at said first focus, and reflector means having a second focus located externally and forward of said collector means, said collector means having opening means through which light is reflected by said reflector means toward said second focus, said collector means being operative to collect light rays emitted by said light source and direct such light rays onto said reflector means, and said reflector means being operative to redirect such light rays back through said collector means and out through said opening means, said light source comprising a lens-end bulb including a lens which projects a cone of light out through said opening means in said collector means, and said bulb also produces additional light rays which are emitted radially in the shape of a conical section onto said collector means which reflects such additional light rays onto said reflector means and said reflector means in turn re-reflects such additional light rays through said collector means and out through said opening means.

2. The system of claim 1 wherein such conical section of light has substantially constant stop and start angles which intersect said collector means.

3. The system of claim 2 wherein said opening in said collector means has a radius substantially corresponding to the perpendicular distance from the principal optical axis of said system to a point on said collector means where the additional ray of light which defines said start angle and the reflected ray of said stop angle substantially intersect.

4. The system of claim 1 further comprising a target positioned in front of said opening means.

5. The system of claim 4 wherein said collector and reflector means cooperate to cause substantially all of the light rays eminating from said light source to strike said target at a minimum acceptance angle.

6. The system of claim 5 wherein the reflected cone of light intersects the projected cone of light on a plane where the cross-sectional area of such intersection substantially equals the cross-sectional area of said target.

7. The system of claim 1 further comprising a target positioned substantially in the plane of said opening means.

8. The system of claim 1 wherein said target is positioned substantially where said projected and reflected cones of light intersect.

9. The system of claim 1 wherein said collector means comprises a rearwardly facing collecting reflector having a concave collecting surface, and said reflector means comprises a back reflector rearwardly spaced from said first focus.

10. The system of claim 9 wherein said back reflector is a cold mirror.

11. The system of claim 9 wherein said collecting reflector and back reflector are parabolic dishes.

12. The system of claim 9 wherein said collecting reflector has an ellipsoidal contour, and said back reflector is in the form of flat plate.

13. The system of claim 12 wherein said back reflector is in the shape of a flat circular disc.

14. The system of claim 12 wherein said back reflector is connected to said collecting reflector by a cylindrical section.

15. The system of claim 12 wherein the ellipsoidal contour of said collecting reflector intersects said back reflector.

16. The system of claim 1 further comprising lens means disposed in said opening means in said collector means for focusing both the projected and reflected light onto a target exteriorly of said reflector assembly in front of said second focus.

17. The system of claim 16 wherein said lens means has a concave outer ring portion that refracts the reflected light into a parallel light beam, and a central portion that refracts the projected light into a parallel light beam.

18. A reflector and light system comprising a reflector assembly including collector means having a first focus, a light source positioned substantially at said first focus, and reflector means having a second focus located externally of said reflector assembly forwardly of said collector means, said collector means having opening means therein for passage of light from said light source, said light source comprising a lens-end bulb including lens means which projects a cone of light out through said opening means in said collector means, and said bulb also produces additional light rays which are emitted radially in the shape of a conical section onto said collector means which reflects substantially all of such additional light rays onto said reflector means, and said reflector means re-reflects such reflected light back through said collector means and out through said opening means.

19. The system of claim 18 wherein such conical section of additional light rays has substantially constant start and stop angles which intersect said collector means.

20. The system of claim 19 wherein said opening means in said collector means has a radius substantially corresponding to the perpendicular distance from the principal optical axis of said system to a point on said collector means where the additional ray of light which defines said start angle and the reflected ray of light of said stop angle substantially intersect.

21. The system of claim 18 further comprising a target positioned in front of said opening means where said projected and reflected light intersect.

22. The system of claim 21 wherein said target is the end of a fiber optic cable.

23. The system of claim 22 wherein said collector and reflector means cooperate to cause substantially all of the projected and reflected light to strike said target at a minimum acceptance angle.

24. The system of claim 23 wherein the reflected light intersects the projected light on a plane where the cross-sectional area of such intersection substantially equals the cross-sectional area of said target.

25. A reflector and light system comprising collector means having an ellipsoidal contour, said collector means terminating at one end in a relatively small opening and terminating in the opposite end in a relatively large opening, a first focus interiorly of said collector means adjacent said one end, and a second focus externally of said other end, a light source positioned substantially at said first focus, said light source comprising a lens-end bulb including a lens which projects a cone of light out through said small opening, and said bulb also produces additional light rays which are emitted radially in the shape of a conical section onto said collector means which reflects such additional light rays toward said second focus.

26. The system of claim 25 wherein such cone of additional light rays has substantially constant start and stop angles which intersect said ellipsoidal contour of said collector means.

27. The system of claim 25 further comprising a first target positioned externally of said small opening, and a second target positioned externally of said large opening.

28. The system of claim 27 wherein said first target is positioned axially inwardly of said first focus corresponding to where the cross-sectional area of said first target substantially equals the cross-sectional area of the projected cone of light passing through said small opening.

29. The system of claim 27 wherein at least one of said targets comprises an end of a fiber optic cable.

30. The system of claim 25 wherein said second target is positioned axially inwardly of said second focus corresponding to where the cross-sectional area of said second target substantially equals the cross-sectional area of the reflected cone of light passing through said large opening of said collector means.

31. A reflector and light system comprising a reflector assembly including collector means having a first focus, a light source positioned substantially at said first focus, and reflector means having a second focus located externally and forward of said collector means, said collector means having opening means through which light is reflected by said reflector means toward said second focus, said collector means being operative to collect light rays emitted by said light source and direct such light rays onto said reflector means, and said reflector means being operative to redirect such light rays back through said collector means and out through said opening means, said collector means comprising a rearwardly facing collecting reflector having concave collecting surface means, and said reflector means comprising a substantially flat back reflector rearwardly spaced from said first focus.

32. The system of claim 31 further comprising adjustment means for adjusting the axial position of said back reflector relative to said collecting reflector to permit proper focusing of light from different light sources.

33. The system of claim 32 wherein said adjustment means comprises an axially adjustable threaded connection between said back reflector and collecting reflector.

34. The system of claim 32 wherein said adjustment means comprises a peripheral flange on said back reflector in threaded engagement with an external surface on said collecting reflector.

35. The system of claim 31 further comprising a target positioned in front of said opening means.

36. The system of claim 35 further comprising external coupling means surrounding said opening means for supporting said target in front of said opening means.

37. The system of claim 36 wherein said target comprises a fiber optic cable, said cable having a cable connector on one end which is secured in place in said coupling means.

38. The system of claim 37 further comprising filter means for filtering out undesirable wavelengths.

39. The system of claim 35 further comprising a light pipe for transmitting light passing through said opening means to said target.

40. The system of claim 39 wherein said target comprises a fiber optic cable, said cable having a cable connector on one end which is secured in place in the axial outer end of said light pipe.

41. The system of claim 40 further comprising filter means within said light pipe for filtering out undesirable wave lengths.

42. A reflector and light system comprising a reflector assembly including collector means having a first focus, light source means positioned substantially at said first, focus, and reflector means having a second focus located externally of said reflector assembly forwardly of said collector means, said collector means having opening means therein for passage of projected light from light source means, said light source means also producing additional light rays which are emitted radially onto said collector means which reflects substantially all of such additional light rays onto said reflector means, and said reflector means re-reflects substantially all such additional light rays back through said collector means and out through said opening means substantially without striking said light source means.

43. The system of claim 42 wherein the additional light rays that are emitted radially by said light source means are in the shape of a conical section having substantially constant start and stop angles which intersect said collector means.

44. The system of claim 43 wherein said opening means in said collector means has a radius substantially corresponding to the perpendicular distance from the principal optical axis of said system to a point on said collector means where the additional light rays which define said start and stop angles substantially intersect.

45. The system of claim 42 wherein said collector means comprises a rearwardly facing collecting reflector having concave collecting surface means, and said reflector means comprises a substantially flat back reflector rearwardly spaced from said first focus.

46. A reflector and light system comprising a reflector assembly including collector means having a first focus, a light source positioned substantially at said first focus, and reflector means having a second focus located externally and forward of said collector means, said collector means having opening means through which light is reflected by said reflector means toward said second focus, said collector means being operative to collect light rays emitted by said light source and direct such light rays onto said reflector means, and said reflector means being operative to redirect such light rays back through said collector means and out through said opening means, said collector means comprising a rearwardly facing collecting reflector having a concave collecting surface, and said reflector means comprising a back reflector rearwardly spaced from said first focus, said back reflector having an axial hole therethrough having a minimum diameter that will permit said light source including a light source holder to pass to facilitate positioning and removal of said light source without interfering with light collection or projection.

* * * * *